Jan. 19, 1943.  E. A. GLYNN  2,308,602
TIRE BEAD ALIGNER
Filed Sept. 30, 1940  3 Sheets-Sheet 1
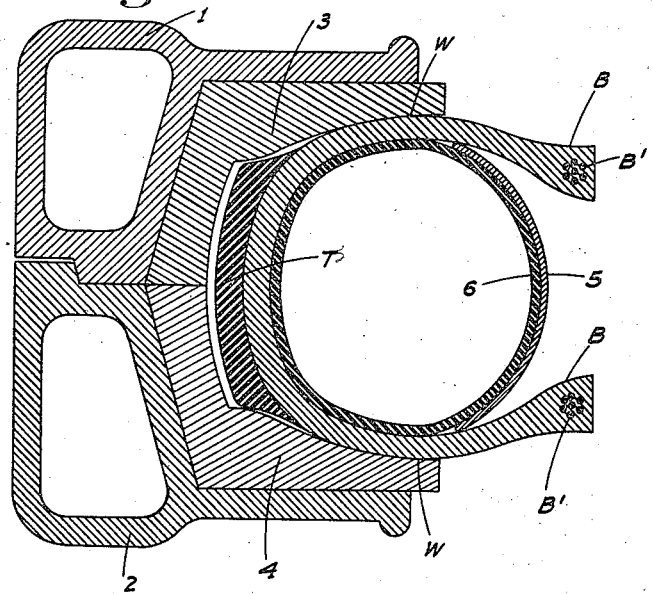
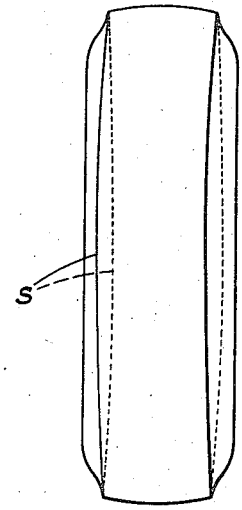
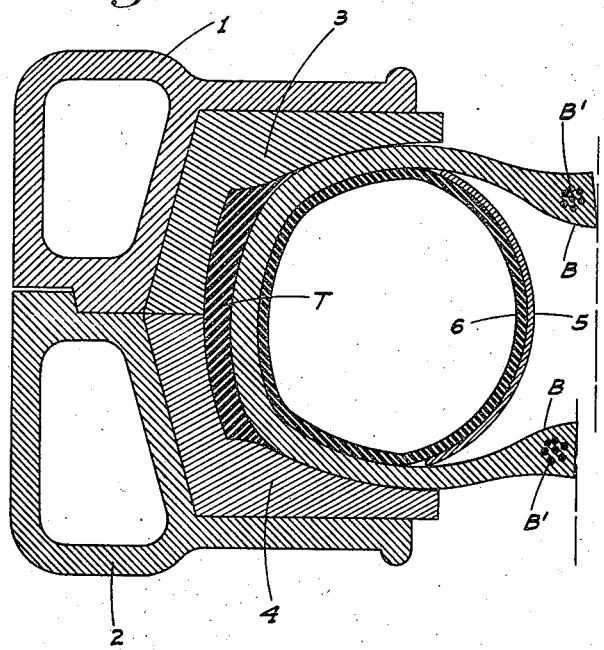
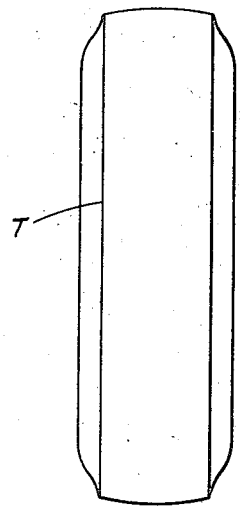
INVENTOR
E. A. Glynn
BY
ATTORNEYS Jan. 19, 1943.   E. A. GLYNN   2,308,602
TIRE BEAD ALIGNER
Filed Sept. 30, 1940   3 Sheets-Sheet 2

INVENTOR
E. A. Glynn
BY
ATTORNEYS

Jan. 19, 1943.　　　　E. A. GLYNN　　　　2,308,602
TIRE BEAD ALIGNER
Filed Sept. 30, 1940　　　3 Sheets-Sheet 3

INVENTOR
E. A. Glynn
BY
ATTORNEYS

Patented Jan. 19, 1943

2,308,602

UNITED STATES PATENT OFFICE 2,308,602

TIRE BEAD ALIGNER

Edwin A. Glynn, Lodi, Calif., assignor to Super Mold Corporation of California

Application September 30, 1940, Serial No. 359,033

2 Claims. (Cl. 18—18)

This invention relates to the tire recapping or retreading art, in which the tires to be retreaded are placed in a full circle mold for heating and vulcanizing, in connection with what is known as an inside collapsible rim, which is placed inside the tire before the latter is placed in the mold, and which serves to close the bead opening and prevent the curing air bag from blowing out when inflated.

When this inside curing rim is used, the bead portions of the tire dangle freely and unconfined below the inner periphery of the skirts of the mold as shown in Fig. 2. As a result of this, it is possible for the opposed beads to shift out of concentric relationship with each other, which will result in the newly applied tread, when cured, being non-centrally or crookedly disposed on the tire.

The principal object of the present invention is to provide an easily applied mechanical means for positively confining the beads in proper concentric and alined relation without interfering with lateral shifting or relative axial movement of the beads as is necessary for proper fitting of the tire in the mold.

A further object is to provide a means for the purpose which in one form is a unitary device which also serves as an aid to handling and placing the tire in the mold. Another objective is to provide a device which may be applied to tires of different sizes without change.

A still further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 shows a cross-section of a mold with a section of a tire in place therein and the inside curing bag and rim disposed in position therein and before any air pressure has been applied. The tire is shown as being normally too small to fit the mold.

Figure 2 shows the same elements as those shown in Fig. 1 but as they appear after the air pressure has been introduced into the curing bag to fill out the tire in an attempt to cause it to fit the mold and in which the beads of the tire have shifted out of line.

Figure 3 shows a plan of the tire tread which would result from a tire cured in the mold in the position shown in Fig. 2.

Figure 4 is a plan of a tire tread which should result from a tire cured in proper position in the mold.

Figure 5:
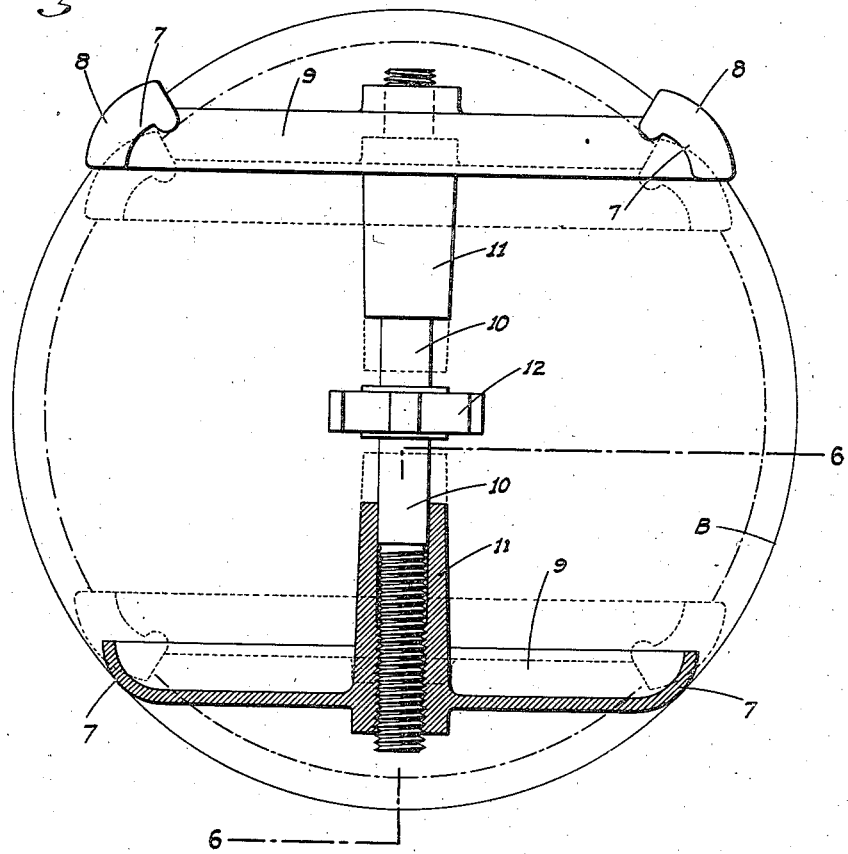
Figure 5 is a plan view, partly in section, of my new bead aligner. The full line circle and the smaller dotted line circle and the dotted lines of the aligner as reduced in size illustrate how one aligner may be adjusted to fit the beads of tires of different bead diameters.

By reference to Figs. 1 to 4 inclusive, I shall now discuss briefly the problem in the art which has been successfully solved by the introduction of my new bead aligner.

In applying a new tread to a used tire it is of course essential that the same be of proper width and should be accurately centered on the periphery of the tire. Such a correct position of the tread is indicated in full lines at T in Fig. 4. An improperly placed or serpentine tread is shown by the full and dotted lines in Fig. 3 at S.

Figs. 1 and 2 illustrate the prior practice of attempting to fit a tire into a mold through the use of so-called inside curing bag and rim. Here the mold steam chamber sections are designated by the numerals 1 and 2, the matrices being indicated by the numerals 3 and 4. A matrix assembly for a given nominal size has a fixed overall diameter and cross-section. However, due to various causes familiar to those skilled in the art, tires of the same nominal size will vary to a considerable extent in actual overall diameters and cross-sections. Thus, if a tire which was too small in overall diameter for the molding cavity were mounted on its ordinary rim and the usual air bag used to inflate it, such a tire would not fill out the mold cavity unless stretched by air pressure beyond allowable tolerances. If too large for the mold, the casing of the tire would buckle. In either case, the tire would be ruined.

In an attempt to overcome this condition, certain operators conceived of the use of the so-called inside curing rim and bag. This usually comprises a sectional hinged rim 5 of the type shown generally in the patent to Kite, No.

2,152,765, which fits and floats inside and between the side walls W of the tire leaving the beads B dangling unconfined below the skirts of the mold. The inside curing air bag 6 then fits between the rim 5 and the tire. The theory of operation of this combination is generally as follows:

Since the beads B are dangling freely and unconfined, they are free to displace from normal position laterally in either direction. Hence, if the tire is small for the mold, as shown in Fig. 1, when the air pressure is applied it is presumed to expand in all directions and pull the side walls and push the tread of the tire into approximate conformity with the mold cavity as illustrated in Fig. 2. With certain sizes and makes of tires, this method of fitting the tire to the mold works fairly well, with one exception. As the pull of the air pressure is exerted against the walls W of the tire, the stiff piano wires B' in the beads B tend to resist this pull. If the wall on one side of the tire is a little thinner than that on the other side, the thinner side way will pull more readily through the space between edge of the rim 5 and the skirt of the matrix. Since the beads B are hanging unconfined, such differential pulling action can then cant the tire so that the bead on one side will be lower than that on the other side as shown by the parallel lines in Fig. 2. When this occurs, the tread T is not properly centered in the mold, but is offside. When the new tread is then cured in this position, it is not true with respect to the body of the tire, but is offside or serpentine, so that the tire will not then give satisfactory service.

The use of my improved tread aliner overcomes this defect and permits of the fairly successful use of inside curing rims and bands.

Figure 6:
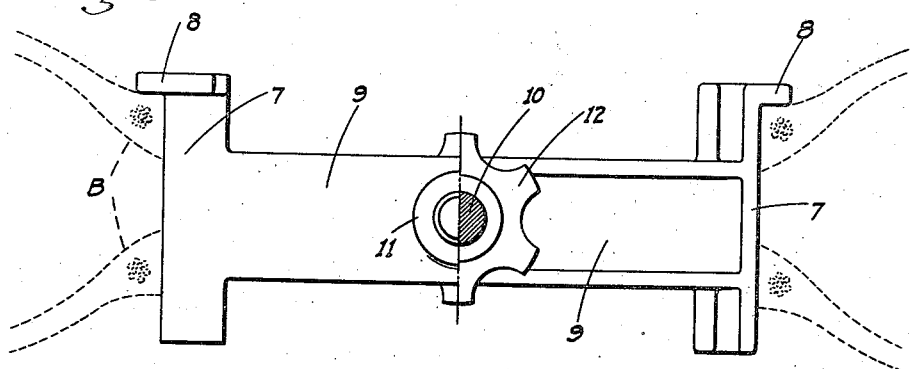
Figure 6 is an end view of the aligner partly in section on a line 6—6 of Fig. 5 and showing the tire beads in dotted lines.

Referring now more particularly to Figs. 5 and 6, my new aligner comprises four arcuate posts 7, somewhat longer than the normal spread of the beads B of a tire. At one end, the posts are formed with enlarged flat heads 8.

These posts are arranged in pairs, those of each pair being rigidly connected by bars 9 so that the posts are maintained parallel to each other. The length of the bars is such that the distance between the outermost edges of the corresponding posts is less than the bead or rim diameter of a tire.

The two post units thus formed are adjustably connected by a right and left hand screw 10 threaded into sleeves 11 rigid with the bars 9 and projecting toward each other from centrally of the length of the bars. A hand wheel 12 for turning the screw is fixed therewith centrally of its ends. The screw and sleeves are arranged so that when the post units are brought together as close as possible, the four posts will be disposed within a circle whose diameter is less than that of the beads of the smallest size tire with which the device may be used.

To operate the device, it is first necessary to relatively contract the posts the amount necessary for the particular tire to be engaged by suitable rotation of the screw. The posts are then inserted into the central opening into the tire until the heads 8 abut against the adjacent beads. The screw is then rotated in a direction to spread or separate the posts, which causes them to press firmly against the beads and since the posts are all rigid and are then naturally parallel with each other, the beads are positively maintained in concentric relation with each other. The device is mounted in place after the inside rim is placed in the tire, and the hand wheel, screw and sleeves of the device form a convenient handle for lifting the tire into the mold.

Figure 8:
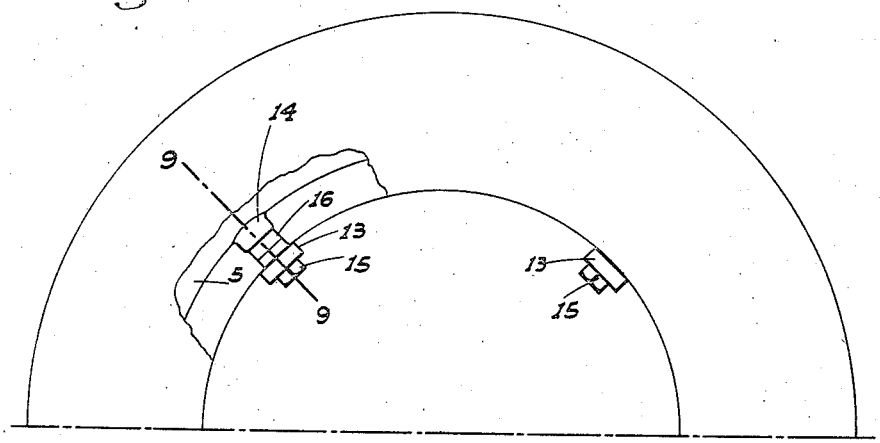
Figure 8 is a modified view showing how the aligning elements may be attached directly to the inside curing rim.
Figure 9:
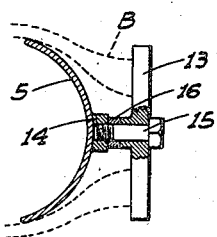
Figure 9 is a sectional view taken on a line 9—9 of Fig. 8.

In Figs. 8 and 9, the same result, as far as maintaining the tire beads in concentric alinement is concerned, is obtained by the use of a plurality of individual bars 13 mounted directly on the inside curing rim. These bars are adapted to extend across and abut against the beads at spaced points in their extent after the inside rim 5 has been placed in the tire. In this modified construction, the rim is provided at spaced points with radial tapped bosses 14, engaged by cap screws 15 passed through the bars 13 centrally of their ends. One or more spacer washers 16 may, if necessary, be placed on each screw between the lug and bar to enable the screw to be advanced until the bar is clamped against movement, without the chance of the rim being pulled out of a centralized position in the tire.

Figure 7:
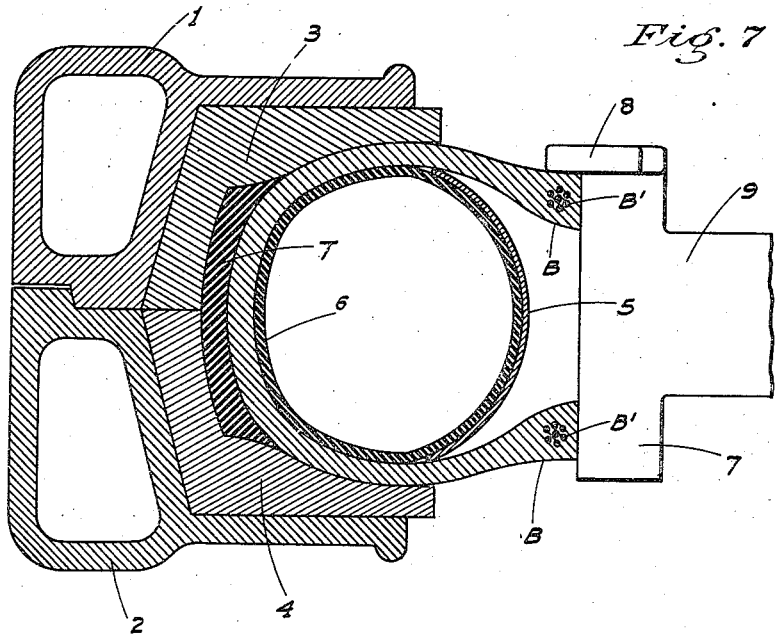
Figure 7 is a view similar to Fig. 2, but showing how the beads of the tire are confined in proper alignment by my new aligner.

Since the posts 8 remain relatively concentric they will, when brought into contact with the beads B, also hold these concentric and parallel with each other so that when the air pressure is applied, the tread of the tire will be uniformly carried into conformity with the mold as shown in Fig. 7, and the new tread will be cured in properly centered position, as shown in Fig. 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the retreading of a tire with the use of an inside rim in the tire whereby the beads are exposed, means to maintain the beads in concentric alignment comprising pairs of spaced posts adapted to extend across the tire beads and to engage the same, bars connecting the posts of each pair as a rigid unit, a hand screw extending between the units and means turnably mounting said screw in connection with the bars of the units and including a tapped member on one unit in which the screw is threaded.

2. In the retreading of a tire with the use of an inside rim in the tire whereby the beads are exposed, an implement to maintain the beads in concentric alignment comprising rigid spaced posts adapted to extend across the tire beads upon movement of the implement axially of the tire into position from one side thereof and disposed on opposite sides of the axis of the tire, means operatively connecting the opposed posts to advance and retract the same relative to each other and enlarged heads on the posts at one end overhanging the bead engaging portion thereof to engage the adjacent bead when the implement is initially moved into position and limiting such movement.

EDWIN A. GLYNN.